United States Patent Office 3,004,977
Patented Oct. 17, 1961

3,004,977
LOWER ALKYL ESTERS OF 1-(2-BENZOYLETHYL)-3-METHYL-4-PHENYLPIPERIDINE - 4 - CARBOXYLIC ACID AND 1-(3-HYDROXY-3-PHENYLPROPYL)-3-METHYL-4-PHENYLPIPERIDINE-4 - CARBOXYLIC ACID
Paul A. J. Janssen, Antwerpse Steenweg 16', Vosselaar, near Turnhout, Belgium
No Drawing. Filed Apr. 29, 1960, Ser. No. 25,508
6 Claims. (Cl. 260—294.3)

The present invention relates to compounds expressed by the formula

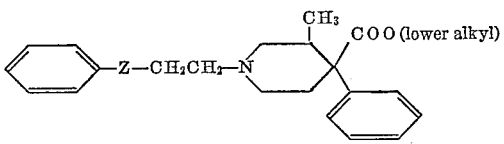

wherein Z is a carbonyl or hydroxyethylene grouping. The nomenclature for these compounds has been simplified throughout this application by designating a 3-methyl group "α" when it is presumably cis to the ester grouping at position 4, and "β" when it has the opposite or trans configuration. The presumption in regard to the stereochemistry rests on the usually reliable method of preferential solubility.

The ketonic compounds of this application may be prepared by a route which begins with the tosylation of 2-hydroxyethyl-2-hydroxypropylamine; the tosylation product is converted to the corresponding dihalide, which is then condensed with phenylacetronitrile to give a 1-tosyl-3-methyl-4-cyano-4-phenylpiperdine. The nitrile is hydrolyzed, and the resultant acid is esterified. Removal of the tosyl moiety and subsequent Mannich base formation involving acetophenone and formaldehyde gives the keto compounds of this invention. The corresponding benzyl alcohols are produced by selective reduction of the keto grouping with sodium borohydride.

The compounds of this invention are highly potent analgesic agents: the lower alkyl 1-(2-benzoylethyl)-3β-methyl-4-phenylpiperidine - 4 - carboxylates have a much higher order of potency than the corresponding compounds which lack the 3-methyl group. They also possess barbiturate potentiating and hypnotic activity.

The following examples are presented to further illustrate the invention; they should not be construed as limiting it in spirit or scope.

Example 1

A mixture of 119 parts of 2-hydroxyethyl-2-hydroxypropylamine and 54 parts of sodium carbonate in 450 parts of water is heated to 70° C.; 190.5 parts of p-toluenesulfonyl chloride are added and the resultant mixture is heated at 95° for one hour. At the end of this time the reaction mixture is cooled to 0° and filtered. The filtercake is extracted with ether. The ether is removed from the extracts and the resultant residue is taken up in isopropyl alcohol. Petroleum ether is added to the solution and the resulting solution is chilled to −20°. Two crops of crystals are collected and may be used without further purification in the remainder of the procedure to follow. Purification may be effected by recrystallization from ethanol-acetone; the sample of N-(2-hydroxyethyl)-N-(2-hydroxypropyl) - p - toluenesulfonamide prepared in this way melts at 66.2–68.2°.

A mixture of 450 parts of the dihydroxy amide and 690 parts of thionyl chloride is heated at 125° for one hour and then cooled. The excess thionyl chloride is evaporated and the residue is taken up in 360 parts of dry toluene. The toluene solution is filtered and reduced in volume to yield N - (2-chloroethyl)-N-(2-chloropropyl)-p-toluenesulfonamide.

A solution of 400 parts of the dichloro amide and 152 parts of sodamide in toluene is heated to about 45°; 110 parts of phenylacetonitrile are added in portions, and the resultant mixture is heated under reflux for 2 hours, then for 5 to 6 hours at room temperature. At the end of this time water is added, and the organic layer is removed and reduced in volume. The residue is treated with hot methanol; filtration of the resultant mixture and concentration of the filtrate gives 1-(4-methylbenzenesulfonyl)-3α-methyl-4-phenyl-4-cyanopiperidine; the purified sample melts at 143.5–146°. The methanol-insoluble portion is recrystallized from butanol to give 1-(4-methylbenzenesulfonyl-3β-methyl-4-phenyl - 4 - cyanopiperidine, melting at 217–218°.

A mixture of 71.5 parts of the "β" isomer, 71.5 parts of potassium hydroxide and 700 parts of ethylene glycol is heated at 170° for 9 hours, and then poured into water. The resultant suspension is filtered, and the filtrate is acidified with hydrochloric acid to precipitate 1-(4 methylbenzenesulfonyl - 3β - methyl - 4-phenylpiperidine-4-carboxylic acid. The purified sample melts at 209.5–211.4°. Similar treatment of the "α" isomer provides 1 - (4 - methylbenzenesulfonyl) - 3α - methyl - 4 - phenylpiperidine-4-carboxylic acid melting at 173.4–175.8°.

Example 2

A mixture of 20 parts of 1-(4-methylbenzenesulfonyl)-3β-methyl-4-phenylpiperidine-4-carboxylic acid and 225 parts of thionyl chloride is stirred until a clear solution is obtained. The excess thionyl chloride is removed and the residue is dissolved in 160 parts of methanol. The methanol solution is stirred and heated under reflux overnight and then cooled to 0° to give methyl 1-(4-methylbenzenesulfonyl) - 3β - methyl - 4 - phenylpiperidine - 4 - carboxylate melting at 137.4–140.3°. Analogous treatment of the "α" isomer provides methyl 1-(4-methylbenzenesulfonyl) - 3α - methyl - 4 - phenylpiperidine-4-carboxylate melting at 94.5–95.4°.

Example 3

By the method of the preceding example the acid chloride from 1-(4-methylbenzenesulfonyl)-3β methyl-4-phenylpiperidine-4-carboxylic acid is treated with ethanol to yield ethyl 1-(4-methylbenzenesulfonyl)-3β-methyl-4-phenylpiperidine-4-carboxylate melting at 102–104.6°. The "α" isomer, prepared similarly, melts at 127.8–128.2°.

Example 4

A sample of 1-(4-methylbenzenesulfonyl)-3β-methyl-4-phenylpiperidine-4-carboxylic acid is converted to the acid chloride as described in Example 2, and this halide is condensed with isopropyl alcohol to yield isopropyl 1-(4-methylbenzenesulfonyl) - 3β - methyl-4-phenylpiperidine-4-carboxylate, melting at 112.5–113.2°. The α-isomer is prepared similarly and melts at 99–101.5°. Similar condensation of the above acid chloride with butanol yields butyl 1 - (4-methylbenzenesulfonyl)-3β-methyl-4-phenylpiperidine-4-carboxylate.

Example 5

A mixture of 78 parts of methyl 1-(4-methylbenzenesulfonyl)-3β-methyl-4-phenylpiperidine-4-carboxylate, 59 parts of phenol and 500 parts of a saturated solution of hydrogen bromide in acetic acid is stirred at room temperature for about 20 hours. Ether is added, and the resultant solution is extracted with water. The water layer is made alkaline with sodium hydroxide, and the basic solution is extracted with ether. The ether solution is dried over magnesium sulfate and then concentrated. Distillation of the residue gives methyl 3β-methyl-4- phenylpiperidine-4-carboxylate which boils at 131–133°/ 0.4 mm. This compound forms a hydrochloride which melts at 191–192.2°. Methyl 3α-methyl-4-phenylpiperidine-4-carboxylate similarly prepared boils at 122–123°/ 0.02 mm.

*Example 6*

Application of the method of the preceding example to ethyl 1-(4-methylbenzenesulfonyl)-3β-methyl-4-phenylpiperidine-4-carboxylate yields ethyl 3β-methyl-4-phenylpiperidine-4-carboxylate, boiling at 126°/0.2 mm. This compound forms a hydrochloride which melts at 175.6–176.2°. Ethyl 3α-methyl-4-phenylpiperidine-4-carboxylate similarly prepared forms an oxalate which melts at 136.2–137.4°.

*Example 7*

A sample of isopropyl 1-(4-methylbenzenesulfonyl)-3β-methyl-4-phenylpiperidine-4-carboxylate, treated by the procedure of Example 5 gives isopropyl 3β-methyl-4-phenylpiperidine-4-carboxylate boiling at 124–126°/0.02 mm. Isopropyl 3α-methyl-4-phenylpiperidine-4-carboxylate boiling at 136°/0.6 mm. is similarly prepared. Butyl 3β - methyl - 4 - phenylpiperidine - 4 - carboxylate is similarly prepared.

*Example 8*

A mixture of 2.4 parts of acetophenone, 0.9 part of paraformaldehyde, 5.4 parts of the hydrochloride of methyl 3β-methyl-4-phenylpiperidine-4-carboxylate, 80 parts of isopropyl alcohol and a few drops of hydrochloric acid is heated under reflux for one hour. An additional 0.3 part of paraformaldehyde is added and the mixture is again heated under reflux for 2 hours. At the end of this time a third portion (0.3 part) of paraformaldehyde is added; the resultant mixture is heated under reflux for 8 hours. The suspension thus obtained is cooled to precipitate methyl 1-(2-benzoylethyl)-3β-methyl-4-phenylpiperidine-4-carboxylate hydrochloride melting at 198–198.8°.

*Example 9*

A solution of 6 parts of ethyl 3β-methyl-4-phenylpiperidine-4-carboxylate in ether is saturated with dry hydrogen chloride gas and the resultant mixture is evaporated to an oil. 80 parts of isopropyl alcohol, 3.2 parts of acetophenone, 1.2 parts of paraformaldehyde, and a few drops of a 30% hydrochloric acid are added and the mixture is heated under reflux for one hour. Then 0.8 part of paraformaldehyde is added and the mixture is heated under reflux for an additional 10 hours. The volume of the reaction mixture is reduced to one-half its initial value by evaporation; 40 parts of acetone is added and the resultant mixture is cooled to −20°. Ethyl 1-(2-benzoylethyl) - 3β - methyl - 4 - phenylpiperidine - 4-carboxylate hydrochloride is obtained. The melting point is 179.7–182.4°; the oxalate melts at 153.2–155.4°.

*Example 10*

Six parts of isopropyl 3β-methyl-4-phenylpiperidine-4-carboxylate hydrochloride, 2.4 parts of acetophenone, 0.9 part of paraformaldehyde, 80 parts of isopropyl alcohol, and a few drops of concentrated hydrochloric acid are heated together under reflux for one hour; an additional 0.3 part of paraformaldehyde is added, and heating is resumed for another 2 hours. At the end of this time 0.3 part of paraformaldehyde is added and the resultant mixture is heated under reflux for 8 hours. The reaction mixture is allowed to cool to room temperature, and there is obtained isopropyl 1-(2-benzoylethyl)-3β-methyl - 4 - phenylpiperidine - 4 - carboxylate hydrochloride melting at 178.4–179.4°. Similar treatment of butyl 3β-methyl-4-phenylpiperidine-4-carboxylate provides butyl 1-(2-benzoylethyl)-3β-methyl-4-phenylpiperidine-4-carboxylate.

*Example 11*

To a solution of 11 parts of ethyl 1-(2-benzoylethyl)-3β-methyl-4-phenylpiperidine-4-carboxylate in 80 parts of ethanol is added 0.5 part of sodium borohydride; this mixture is stirred at room temperature for 2 hours and then allowed to stand overnight. Decomposition is effected by addition of 20 parts of 40% hydrochloric acid. The solvents are evaporated and the residue is made alkaline. The basic residue is taken up in chloroform, and the chloroform solution is dried over sodium sulfate; evaporation of the chloroform yields a residue which is taken up in ether. The ether solution is saturated with dry hydrogen chloride gas, causing the hydrochloride of ethyl 1 - (3 - phenyl - 3 - hydroxypropyl) - 3β - methyl-4-phenylpiperidine-4-carboxylate to precipitate. The purified sample melts at 196.6–197.4°. The other lower alkyl esters of 1-(2-benzoylethyl)-3β-methyl-4-phenylpiperidine-4-carboxylic acid suffer reduction to the corresponding alcohols in a similar way.

What is claimed is:

1. A compound of the formula

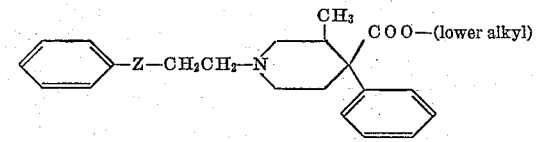

wherein Z is a member of the class consisting of carbonyl and hydroxymethylene groups.

2. A compound of the formula

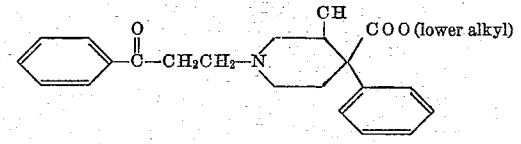

3. Methyl 1-(2-benzoylethyl)-3β-methyl-4-phenylpiperidine-4-carboxylate.

4. Ethyl 1-(2-benzoylethyl)-3β-methyl-4-phenylpiperidine-4-carboxylate.

5. Isopropyl 1-(2-benzoylethyl)-3β-methyl-4-phenylpiperidine-4-carboxylate.

6. Ethyl 1-(3-hydroxy-3-phenylpropyl)-3β-methyl-4-phenylpiperidine-4-carboxylate.

References Cited in the file of this patent
UNITED STATES PATENTS
2,962,501   Cutler et al. _____ Nov. 29, 1960